(12) United States Patent
Drews et al.

(10) Patent No.: US 8,722,248 B2
(45) Date of Patent: May 13, 2014

(54) ACTIVE ELEMENT AND BATTERY AS WELL AS METHOD FOR THE PRODUCTION THEREOF

(75) Inventors: Juergen Drews, Pirna (DE); Tim Traulsen, Pirna (DE); Gerd Fehrmann, Pirna (DE); Thomas Hucke, Dresden (DE); Roland Staub, Berggiesshuebel (DE)

(73) Assignee: Biotronik CRM Patent AG, Baar (CH)

( * ) Notice: Subject to any disclaimer, the term of this patent is extended or adjusted under 35 U.S.C. 154(b) by 1075 days.

(21) Appl. No.: 12/198,756

(22) Filed: Aug. 26, 2008

(65) Prior Publication Data

US 2010/0055566 A1    Mar. 4, 2010

(51) Int. Cl.
*H01M 4/00*    (2006.01)
(52) U.S. Cl.
USPC ........................................ 429/220; 429/218.1
(58) Field of Classification Search
USPC .......................................................... 429/220
See application file for complete search history.

(56) References Cited

U.S. PATENT DOCUMENTS

| 4,260,668 | A | 4/1981 | Lecerf et al. |
| 4,448,864 | A | 5/1984 | Broussely |
| 2007/0009799 | A1* | 1/2007 | Zheng ........................ 429/231.8 |
| 2007/0132143 | A1* | 6/2007 | Fehrmann et al. ......... 264/271.1 |
| 2008/0213666 | A1* | 9/2008 | Ru-Feng Tsai et al. ...... 429/229 |
| 2008/0318133 | A1* | 12/2008 | Matsuyama et al. .......... 429/300 |

FOREIGN PATENT DOCUMENTS

| DE | 19834091 | 2/2000 |
| DE | 69613333 T2 | 10/2001 |
| DE | 102005059375 | 6/2007 |
| DE | 102007034020.8 | 7/2007 |
| DE | 102006021158 | 9/2007 |
| EP | 1098379 | 5/2001 |
| EP | 1796187 | 6/2007 |
| EP | 1852927 | 11/2007 |

OTHER PUBLICATIONS

European Search Report, dated Nov. 24, 2008, 5 pages.
German Search Report, dated Jan. 28, 2008, 2 pages.

* cited by examiner

*Primary Examiner* — Ula C Ruddock
*Assistant Examiner* — Jacob Marks
(74) *Attorney, Agent, or Firm* — ARC IP Law, PC; Joseph J. Mayo

(57) ABSTRACT

The present invention relates to an active element for a battery whose material contains copper oxyphosphate and an additive improving the conductivity. The proportion of the additive improving the conductivity in the material is between 3 and 7 wt. %, preferably between approximately 3 wt. % and approximately 5 wt. %, and the proportion of the copper oxyphosphate in the material adds up to 100 wt. %. The invention additionally relates to a battery having an active element of this type as well as a method for producing an active element of this type and a battery of this type. The battery according to the invention is suitable in particular for use in medical implants.

10 Claims, 4 Drawing Sheets

ACTIVE ELEMENT AND BATTERY AS WELL AS METHOD FOR THE PRODUCTION THEREOF

BACKGROUND OF THE INVENTION

1. Field of the Invention

The present invention relates to an active element for a battery whose material contains a copper oxyphosphate and an additive which improves the conductivity. The present invention also relates to a method for producing an active element of this type. In addition, the invention relates to a battery and a method for the production thereof.

2. Description of the Related Art

A battery is an electrochemical energy store, whose stored chemical energy is converted by an electrochemical redox reaction into electrical energy. Because of different requirements for batteries in regard to voltage, power, internal resistance, and capacitance, for example, manifold different battery types currently exist. The properties of the batteries are essentially influenced by the composition of the material of the active elements of the batteries.

The term "active element" is used hereafter in general for an electrode of the battery, i.e., cathode or anode.

Materials for positive active elements of batteries which contain copper oxyphosphate are known from the publications cited below. The term copper oxyphosphate hereafter includes the compound $$Cu_nO_p(PO_4)_2 \text{ with } 3 < n \leq 6 \text{ and } p=(n-3),$$

n=4 being preferred. A cathode having copper oxyphosphate is preferably used in a battery together with an anode which comprises lithium. A solution which does not contain water and in particular comprises a lithium compound in a non-aqueous solvent or solvent mixture is frequently used as the electrolyte.

A material for a positive active element of a battery and a method for producing this active element are known from the publications DE 10 2006 021 158 A1, DE 10 2006 059 375 A1, and U.S. Pat. No. 4,260,668. The material of the positive active element predominantly comprises copper oxyphosphate $Cu_4O(PO_4)_2$ as the active material, carbonaceous conductivity additives such as graphite, and fluoridated binders, such as polytetrafluoroethylene (PTFE). This compound was compacted to form an anode or cathode. The copper oxyphosphate was previously produced by dehydrating a hydroxyphosphate at various temperatures (590° C., 600° C., 620° C., and 900° C.).

The publication U.S. Pat. No. 4,448,864 discloses a lithium-manganese dioxide battery whose positive electrode also contains copper oxyphosphate and graphite as well as PTFE as a binder, in addition to manganese dioxide. The proportion of the copper oxyphosphate in the composition of this electrode is 10 wt. % in an example described in this publication. Due to the proportion of the copper oxyphosphate, a second plateau is reached at approximately a voltage of 2.2 V to 2.3 V during the discharge of the battery, the extent of the plateau being determined by the quantity of the copper oxyphosphate in the material of the positive electrode.

For use in medical implants having electronic components for a human or an animal, such as cardiac pacemakers, which are to be provided with wireless, preferably bidirectional data transmission, batteries are required which have a high capacitance on one hand and allow high discharge currents in the mA range to be drawn on the other hand. A high capacitance of the battery lengthens the usage time of the medical implant and thus decreases the number of surgical interventions, because replacing the battery and/or inserting a new implant having a fully charged battery is typically connected to a surgical intervention. A higher discharge current is required for providing higher currents for data transmission.

The cathode materials for lithium primary batteries described in the above-mentioned publications have the disadvantage that the batteries equipped therewith do not have a higher discharge capacitance than the currently used lithium-iodine batteries. In contrast, currents in the mA range may not be drawn from lithium-iodine batteries.

BRIEF SUMMARY OF THE INVENTION

The object of the present invention is accordingly to provide an active element which has a high capacitance and allows current pulses in the mA range to be drawn when it is used in a battery. The object of the invention also comprises providing a corresponding battery as well as specifying a cost-effective and simple method for producing an active element and/or a battery of this type.

The above object is achieved by an active element in which the proportion of the additive improving the conductivity in the material is between 3 wt. % and 7 wt. %, preferably between approximately 3 wt. % and approximately 5 wt. %, and the proportion of the copper oxyphosphate in the material adds up to 100 wt. % of the material.

Surprisingly, it has been shown that with the composition of the material of the active element according to the invention, the proportion of the binder may be greatly decreased without the element losing the required mechanical strength, so that the binder may typically be dispensed with entirely. In this manner, the proportion of active material in the electrode may be significantly increased, because the volume of the active element otherwise claimed by a binder may be replaced entirely by dischargeable active material (copper oxyphosphate).

This results in the great advantage of an active element of this type, namely that a battery having an active element of this type has a higher discharge capacitance than a typical lithium-iodine battery at the same volume. In addition, a battery having an active element of this type as a cathode has a lower internal resistance, so that currents in the mA range having pulse lengths of more than one second may be drawn. In this way, wireless data transmission may be provided in medical implants equipped with batteries of this type, because the corresponding electronic components may be supplied with sufficiently high currents. The current carrying capacity is high enough in this case that these implants are suitable for bidirectional data telemetry.

Pulsed currents having comparable current strength and pulse length may not be drawn from the lithium-iodine batteries used according to the prior art, because the internal resistance of these batteries is significantly greater.

A further advantage of the active element according to the invention is that the internal resistance of batteries having an active element of this type decreases with time and/or remains nearly constant over a long period of time of the discharge, while the internal resistance of the conventional lithium-iodine batteries continually rises during the discharge.

The present invention is also based on the finding that the proportion of the additive improving the conductivity, e.g., graphite, may be significantly decreased in relation to the prior art. The proportion of the active component, copper oxyphosphate, may be significantly increased in this manner. A reduction of the graphite proportion is made possible in that the electrical conductivity of the electrode is greatly increased by the elemental copper formed in the course of the discharge. This procedure may be described as follows:

$$Cu_4O(PO_4)_2 + 8Li \rightarrow 4Cu + Li_2O + 2Li_3PO_4.$$

The copper formed in this reaction causes a strong reduction of the internal resistance of the battery, above all at the beginning of the discharge. For example, the internal resistance of the battery with a graphite proportion of only 5% in the cathode is halved upon a capacitance removal of only 3% from the battery. The capacitance decrease which is required for the reduction of the internal resistance is slight in comparison to the capacitance acquisition achieved by the increased proportion of the active component of the electrode. This effect is also present in the event of a higher proportion of conductive additives according to the prior art, but is significantly less in evidence therein, because it is less pronounced.

Furthermore, it is advantageous if the particle size of the copper oxyphosphate particles is between approximately 1 µm and approximately 100 µm. The particle size may be determined using laser diffraction spectrometry, for example.

In a preferred exemplary embodiment, the additive improving the conductivity contains carbon black and/or graphite, preferably expanded graphite. Expanded graphite (also called flexible graphite) is understood here as a graphite which is produced from natural graphite. Firstly, graphite intercalation compounds are produced from the natural graphite, which are subsequently thermally decomposed (expanded) again. Loose graphite accumulations made of pure graphite arise. Alternatively or additionally, graphite shaped like plates, balls, or potatoes and/or conductive fibers such as vapor grown fibers may be used as the additive improving the conductivity.

The above object is also achieved by a method for producing an active element for a battery having the following steps:
a) producing a homogeneous mixture at least made of powdered copper oxyphosphate and an additive improving the conductivity, the proportion of the additive improving the conductivity in the mixture being between 3 wt. % and 7 wt. %, preferably between approximately 3 wt. % and approximately 5 wt. %, and the proportion of the copper oxyphosphate in the material adding up to 100 wt. % of the material, and
b) compacting the mixture produced according to step a) into the active element of the desired shape using uniaxial or isostatic compression.

The method according to the invention for producing an active element for a battery is distinguished in that it allows the production of the active element described above cost-effectively and easily. In particular, active elements having a sufficient strength for use in batteries may be produced. A stamp-matrix method is preferably applied in step b).

If necessary, a drying step may follow step b). Alternatively or additionally to the drying step, in a further step the compressed shape may be cut into a desired shape, e.g., into an active element having a desired thickness (e.g., for thin electrodes).

In an especially preferred exemplary embodiment, the compaction in step b) is performed at a pressure which is between approximately 30 kN/cm² and approximately 40 kN/cm². Active elements having especially good strength values may be achieved using a compression pressure in the cited range.

Analogously to the active element according to the invention, it is especially advantageous if the proportion of the additive improving the conductivity of the mixture produced according to step a) is between approximately 3 wt. % and approximately 5 wt. % and/or the particle size of the powdered copper oxyphosphate is between approximately 1 µm and approximately 100 µm. The use of an additive improving the conductivity which contains carbon black and/or graphite, preferably expanded graphite, is also preferred.

The above object is also achieved by an active element for a battery which is produced according to the method specified above. This active element allows the production of a battery having the advantages specified above.

In addition, the above object is achieved by a method for producing a battery in which firstly a first active element is produced according to the above method and subsequently the battery is assembled from at least one housing, one electrolyte, and one second active element. The first active element preferably forms the cathode and the second active element forms the anode in this case.

The object is also achieved by a battery which has an active element as described above or is produced according to the above method.

The method according to the invention for producing a battery is simple and cost-effective. The resulting battery has a high discharge capacitance and a low internal resistance which decreases with time, and allows current pulses in the mA range to be drawn. It is therefore suitable in particular for use in medical implants which are implemented for wireless data transmission.

Further goals, features, advantages, and possible applications of the invention result from the following description of an exemplary embodiment for an active element, the properties of the batteries according to the invention having an active element according to the invention being illustrated on the basis of diagrams. All features described and/or shown in the figures form the subject matter of the invention per se or in arbitrary combinations, independently of their wording in individual claims or what they refer back to.

DETAILED DESCRIPTION OF THE INVENTION

To produce the active element according to the invention according to the exemplary embodiment, copper oxyphosphate is first prepared. For this purpose, 125 mL 85% phosphoric acid is diluted using 500 mL distilled water. 270 g copper (II) oxide is added to this solution and it is subsequently heated for four hours under reflux. After the cooling, the copper (II) hydroxyphosphate formed is filtered off, thoroughly washed with distilled water, and subsequently dried at 100° C. The copper (II) hydroxyphosphate is then calcined at 900° C. for one hour, the desired copper (II) oxyphosphate resulting by water cleavage.

0.275 g expanded graphite is then homogeneously mixed with 5.22 g copper oxyphosphate of the copper oxyphosphate thus obtained. This powdered mixture is compacted employing a stamp-matrix method at a pressure of 35 kN/cm$^2$ using uniaxial compression into a mechanically stable electrode having a thickness of 3.2 mm, an active surface area of 10.5 cm$^2$, and a volume of 1.68 cm$^3$.

The active element according to the invention thus produced is assembled as the cathode with an anode comprising lithium and a housing and an electrolyte into a battery according to the invention. A 1-molar solution of lithium perchlorate in a mixture of 1,2-dimethoxyethane, ethylene carbonate, and propylene carbonate (4:4:2) is used as the electrolyte.

Figure 1:
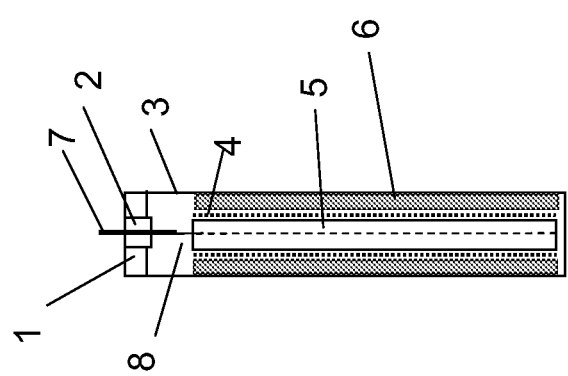
FIG. 1 shows a battery according to the invention having an active element according to the invention as the cathode in a cross-section.

The battery according to the invention shown in FIG. 1 has a cathode 5 designed as a discharge lattice, which was produced as the first active element according to the invention as explained above. The external shape of the cathode 5 is designed as plate-shaped. A separator 4 is situated on each of the two sides of the largest faces of the cathode 5. One anode 6 is provided in each case as the second active element opposite to the exterior side of the separators 4, which are also designed as plate-shaped. The electrolyte 8 is located between cathode 5 and anodes 6. The cathode 5 and the anodes 6 are connected to terminals 7, which are led outward via a glass-metal bushing 2 through the cover 1 of the battery. The cover 1 closes the housing 3, in which cathode 5, separator 4, anode 6, and the electrolyte are situated, hermetically sealed on top.

Figure 2:
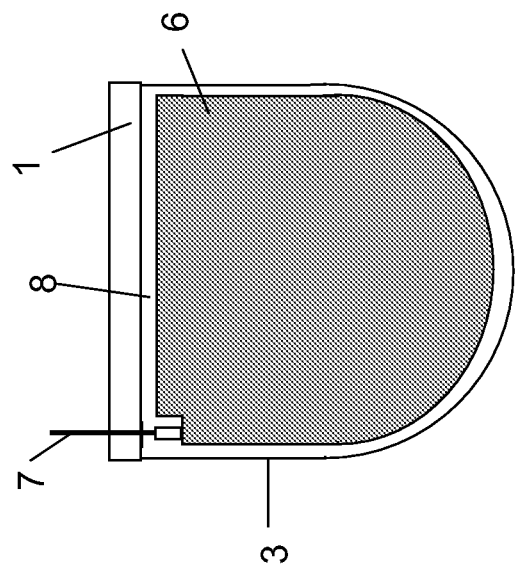
FIG. 2 shows the battery according to the invention from FIG. 1 in a further cross-section.

FIG. 2 shows the battery shown in FIG. 1 in a cross-section which runs through an anode 6 perpendicular to the cross-section shown in FIG. 1.

Figure 3:
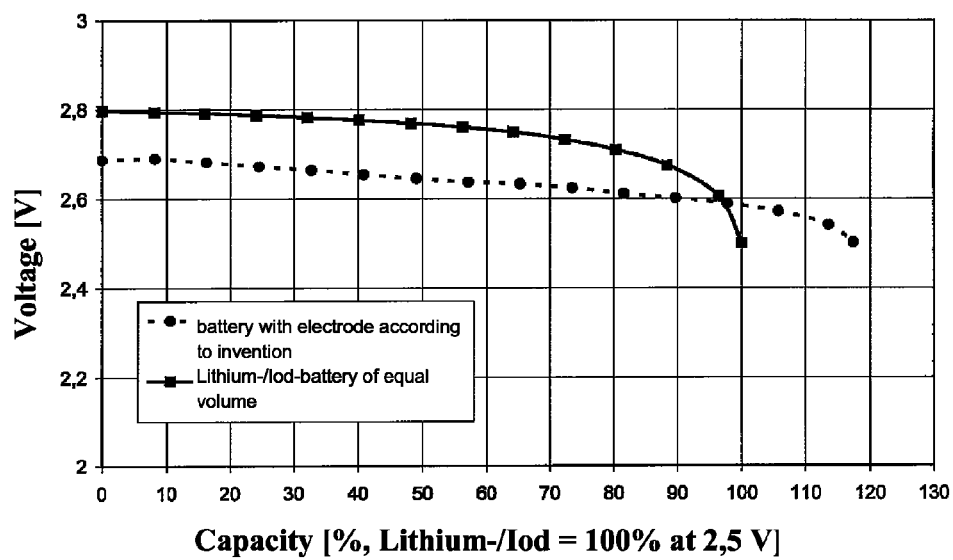
FIG. 3 shows a comparison of the discharge capacitance (volume-related capacitance) in % of a battery having an active element produced according to the exemplary embodiment as the cathode (dashed line) to a lithium-iodine battery of equal volume (solid line) at various discharge voltages in V, the capacitance of a lithium-iodine battery at 2.5 V being fixed as 100% and the discharge occurring at a constant resistance of 100 kΩ.

In the comparison of the battery according to the invention in regard to the discharge capacitance to a lithium-iodine battery of equal volume shown in FIG. 3, the discharge occurs over a period of time of four months. It may be seen in FIG. 3 that the battery shown by a dashed line having the active element according to the invention has a significantly higher discharge capacitance than the typical lithium-iodine battery.

Figure 4:
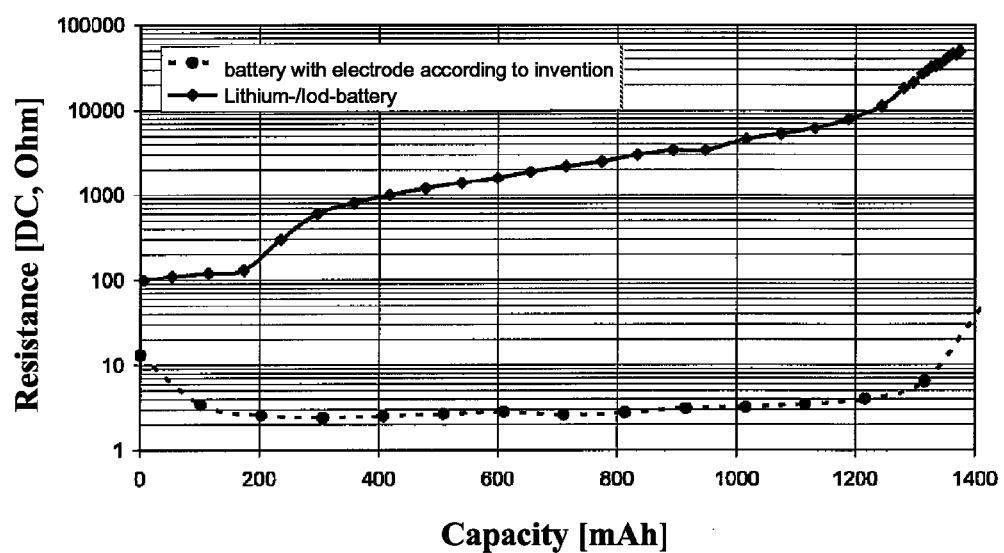
FIG. 4 shows a comparison of the battery resistance (direct current resistance in Ω) of a battery having an active element produced according to the exemplary embodiment as the cathode (dashed line) to a lithium-iodine battery of equal volume (solid line) as a function of the capacitance in mAh in a logarithmic plot.

FIG. 4 shows the comparison of the battery according to the invention used for the comparison in FIG. 3 having the electrode according to the invention to a lithium-iodine battery of equal volume in regard to the internal resistance. It may be seen from the diagram that the battery according to the invention having an active element according to the invention has a significantly lower internal resistance than a typical lithium-iodine battery of equal volume.

Figure 5:
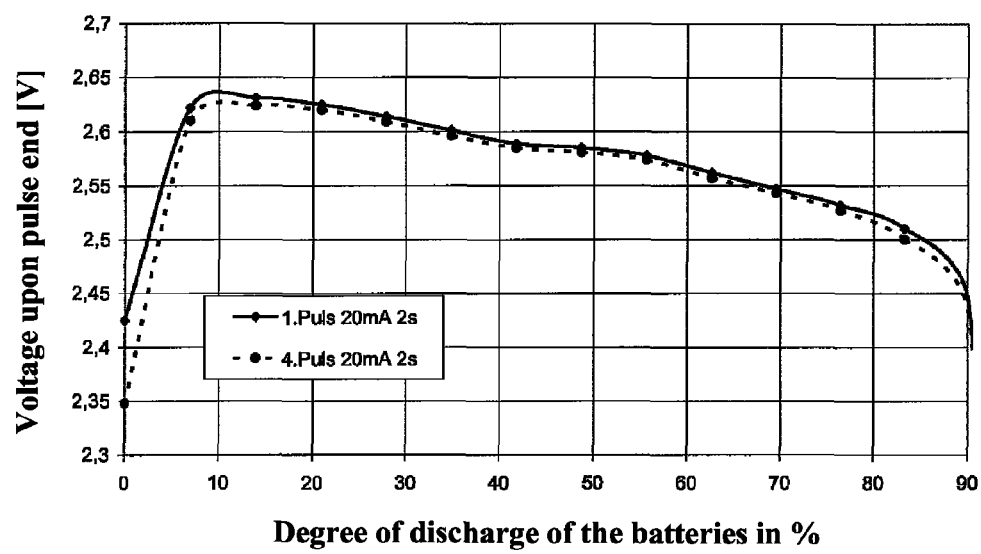
FIG. 5 shows the pulse carrying capacity of a battery having an active element produced according to the exemplary embodiment as the cathode shown by a plot of the voltage upon pulse end in V over the degree of discharge of the battery in %, the voltage values after the first pulse being identified by a solid line and the voltage values after the fourth pulse being identified by a dashed line. The pulse discharge occurred over 4 pulses having a current strength of 20 mA each over a pulse duration of 2 seconds each, a pause of 15 seconds being maintained between the individual pulses.

FIG. 5 shows the pulse carrying capacity of the battery according to the invention used for the comparisons shown in FIGS. 3 and 4. It may be seen that the voltages plotted at the particular degree of discharge do not differ significantly at pulse end of the fourth pulse (dashed line) in relation to the voltages of the first pulse (solid line). The pulse carrying capacity of the battery according to the invention may therefore be assessed as high at the current strengths used in the mA range.

LIST OF REFERENCE NUMERALS 1 cover
2 glass-metal bushing
3 housing
4 separator
5 discharge lattice of the cathode
6 anode
7 terminal
8 electrolyte

What is claimed is:

1. An active element for a battery whose material contains copper oxyphosphate and
   an additive which improves conductivity that consists essentially of
      carbon black and/or
      graphite; and,
   wherein a proportion of the additive that improves conductivity in the material is between approximately 3 wt. % and approximately 7 wt. %, and
      the proportion of the copper oxyphosphate in the material together with the proportion of the additive adds up to 100 wt. % of the material.

2. The active element according to claim 1 wherein the proportion of the additive is between approximately 3 wt. % and approximately 5 wt. %.

3. The active element according to claim 1 wherein a particle size of particles of the copper oxyphosphate is between approximately 1 μm and approximately 100 μm.

4. The active element according to claim 1, wherein the additive which improves conductivity contains carbon black and/or graphite.

5. The active element according to claim 1, wherein the additive which improves conductivity contains expanded graphite.

6. An active element for a battery whose material contains copper oxyphosphate and
   an additive which improves conductivity; and,
   wherein a proportion of the additive that improves conductivity in the material is between approximately 3 wt. % and approximately 7 wt. %, and
      the proportion of the copper oxyphosphate in the material along with the proportion of the additive forms all of the material, wherein said material contains no binder.

7. The active element according to claim 6 wherein the proportion of the additive is between approximately 3 wt. % and approximately 5 wt. %.

8. The active element according to claim 6 wherein a particle size of particles of the copper oxyphosphate is between approximately 1 μm and approximately 100 μm.

9. The active element according to claim 6, wherein the additive which improves conductivity contains carbon black and/or graphite.

10. The active element according to claim 6, wherein the additive which improves conductivity contains expanded graphite.

* * * * *